INVENTOR.
DANIEL LEJEUNE

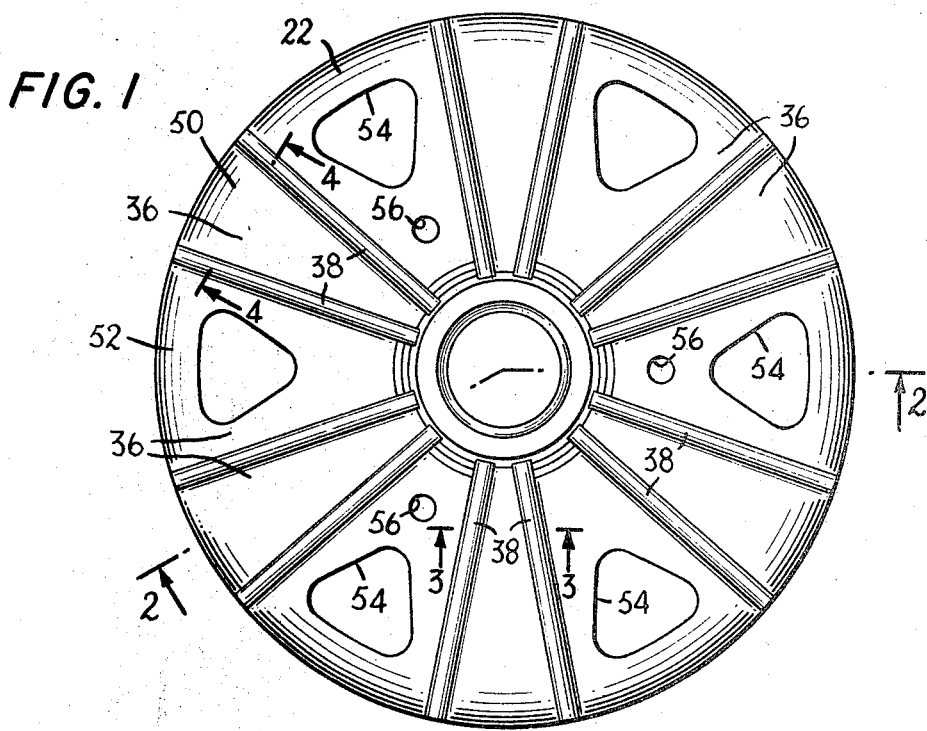
FIG. 1
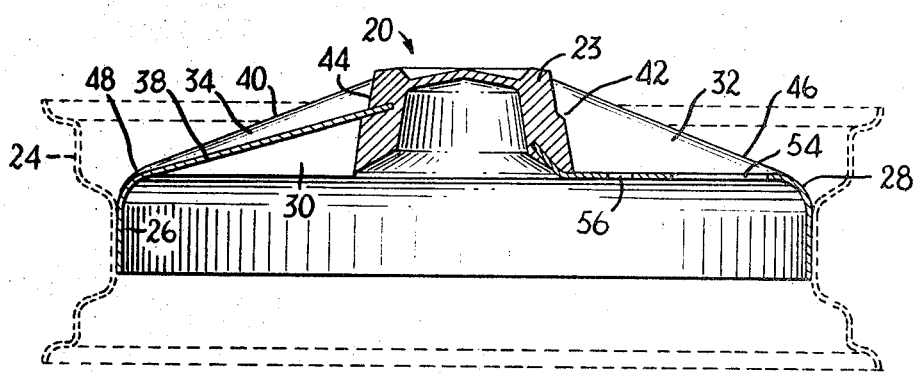
FIG. 2
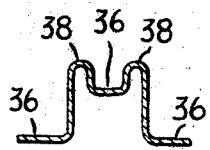
FIG. 3
FIG. 4
INVENTOR.
DANIEL LEJEUNE
BY
Burnbaugh, Free, Graves & Donohue
his ATTORNEYS

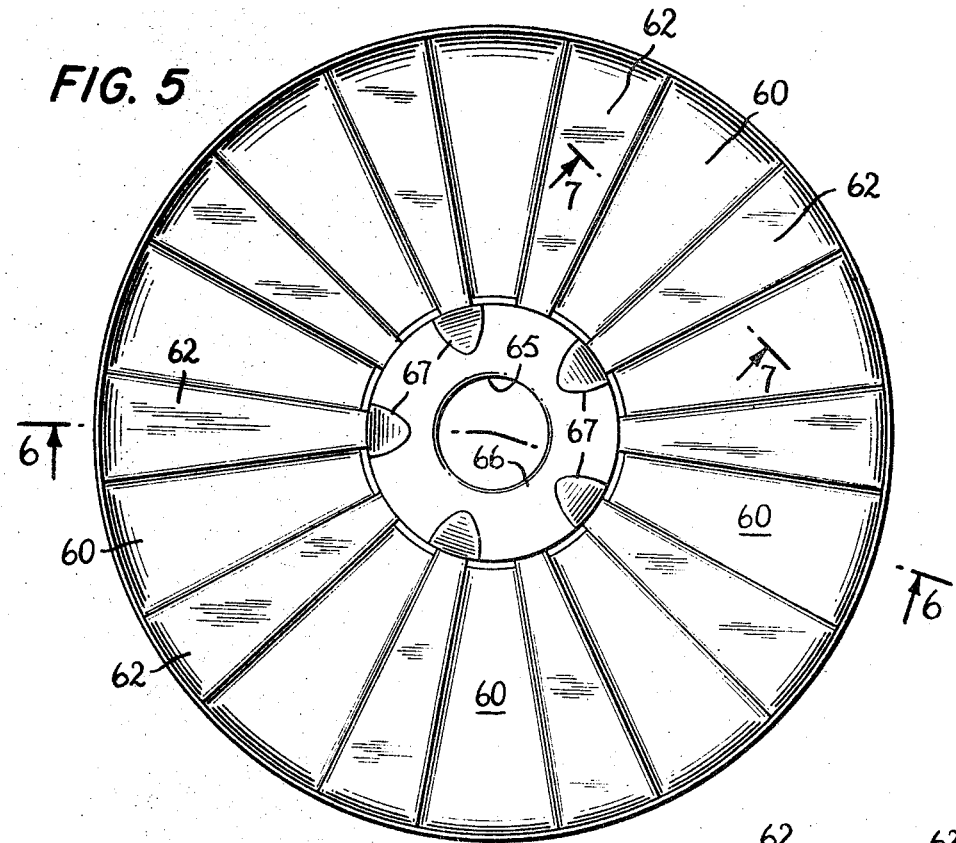
FIG. 5
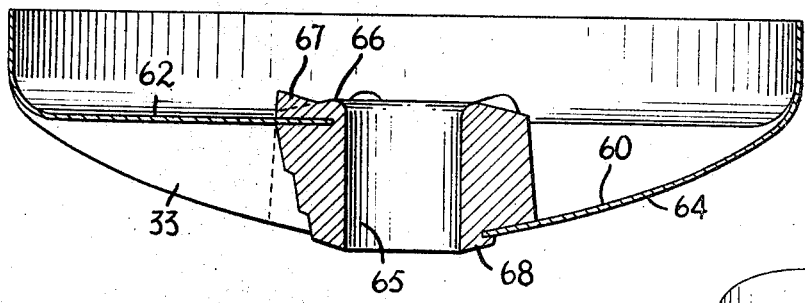
FIG. 6
FIG. 7
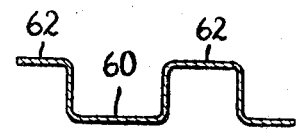
FIG. 9
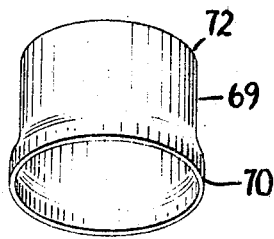
FIG. 8
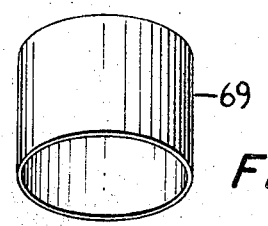
INVENTOR.
DANIEL LEJEUNE
BY
his   ATTORNEYS

INVENTOR.
DANIEL LEJEUNE

United States Patent Office 3,547,494
Patented Dec. 15, 1970

3,547,494
WHEELS FOR AUTOMOTIVE VEHICLES
Daniel Lejeune, Clermont-Ferrand, France, assignor to Compagnie Generale des Etablissements Michelin, raison sociale Michelin & Cie, Clermont-Ferrand, France
Continuation of application Ser. No. 689,668, Dec. 11, 1967. This application Nov. 19, 1969, Ser. No. 871,690
Claims priority, application France, Dec. 12, 1966, 87,141
Int. Cl. B60b *3/12*
U.S. Cl. 301—64
10 Claims

ABSTRACT OF THE DISCLOSURE

A wheel disk has a circumferential profile formed with crenellations. The depth of the crenellations is maximum adjacent to the hub and ranges from the maximum down to zero adjacent to the rim. In making a wheel disk, a generally cylindrical tube is formed, the tube is widened at one end to form a border free of undulations, and the other end of the tube is folded down to impart to the central portion of the disk the desired final configuration. The tube is inserted for the folding operation between a ring of punches and a ring of counter-punches. The punches are pivoted inwardly toward the axis of the ring of punches by a cam plate, and the pivoting of the counter-punches is limited by a second plate.

This application is a continuation of application Ser. No. 689,668, filed Dec. 11, 1967, now abandoned.

BACKGROUND OF THE INVENTION

This invention relates to wheels, and more particularly, to a novel and highly-effective wheel having a wheel disk formed with crenellations and to a method and apparatus facilitating the manufacture of wheel disks.

The increased operating speeds of modern automotive vehicles require greater rigidity of automotive wheels. In the case of conventional wheels, the wheel disk, formed by the stamping of a blank, is generally curved in order to increase its rigidity, mainly in an axial direction. Conventional automotive wheels are insufficiently rigid, however, in radial, circumferential, and axial directions, unless formed of excessively great thicknesses of metal.

In order to increase wheel rigidity, it is of course possible to increase the thickness of the metal plate used in the manufacture of the wheel disks or improve the quality of the metal employed. In each case, however, an inordinate increase in the cost of the wheel results, not only because more metal or more expensive metal is required but also because more powerful and heavier manufacturing tools become necessary in the manufacturing process. Moreover, heavier wheels necessitate a strengthening and corresponding increase in costs of other parts of the automotive vehicle on which the wheels are mounted.

The various expedients heretofore tried for the purpose of overcoming the problems outlined above have not been entirely successful.

For example, the manufacture of wheel disks having the sheet metal thereof formed into fan-shaped folds has been proposed. In the case of this expedient, circumferential sections of the disk have the shape of broken or wavy lines, and the disk consists of a succession of facets forming two by two dihedral angles. The angle of dihedrons may be constant along the radius of the disk, in which case the facets are plane. Or, the angle may be variable, in which case the facets have a helicoidal form, the angle of consecutive facets opening or becoming more obtuse in the direction of the periphery of the disk. This fan-shaped folding provides some stiffening of the disk in an axial direction but not in the radial and circumferential directions: when subjected to radial or circumferential stresses, the fan folds or unfolds, even though the stresses are comparatively slight.

Another conventional expedient is the provision of crenellations of constant depth in the wheel disk. While this structure offers certain advantages, it is not adequately tailored to the stresses to which the various parts off the wheel disk are subjected. Specifically, this expedient results in the same rigidity, and thus the same resistance to axial stresses, close to the axis and close to the periphery. The wheel disk is not subjected to the same stresses close to the axis as close to the periphery, and, as a result, the conventional structure is of necessity either insufficiently strong and rigid or unnecessarily strong and rigid, at least at some portion thereof. In the former case, the wheel is dangerous, particularly at high speed; in the latter case, the wheel is unnecessarily expensive.

SUMMARY OF THE INVENTION

An object of the present invention is to remedy the problems outlined above. In particular, an object of the invention is to provide a wheel disk well adapted to withstand stresses in the three main directions in which these stresses act: that is, the radial, circumferential, and axial directions. From a somewhat different standpoint, an object of the invention is to prevent deformations of an automotive wheel due to load and centrifugal force, driving and braking torques, and lateral thrusts, especially in curves.

Another object of the invention is to provide a rapid and efficient method of manufacturing a wheel disk.

A further object of the invention is to provide inexpensive apparatus for the manufacture of wheel disks.

In attaining the foregoing and other objects of the invention, a wheel is provided having a wheel disk, a hub attached to the disk for mounting the wheel on an axle, and a rim attached to the disk for mounting a tire on the wheel. In accordance with the invention, the circumferential profile of the disk is formed with crenellations, the depth of the crenellations being maximum adjacent to the hub and ranging from the maximum down to zero adjacent to the rim. The crenellations include lateral portions between adjacent crenels and merlons, the lateral portions being generally triangular with a base adjacent to the hub and an apex adjacent to the rim. The disk is formed at the locus of connection to the rim with a border free of undulations. The crenellations facilitate rigid attachment of the disk to the hub, and the border facilitates rigid attachment of the disk to the rim.

The objects of the invention are attained also, in a representative method of making a wheel disk, by the steps of forming a generally cylindrical tube, widening a first end of the tube to produce a border free of undulations, and folding down the second end of the tube to impart to the central portion of the disk the desired final configuration.

The objects of the invention are further attained, in representative apparatus of the invention, by the combination of an outside ring of punches each having a tip and a base and a generally triangular operative face and being pivotable about its base to swing the triangular operative face from a position generally parallel to the axis of the ring to a position inclined towards the axis of the ring. An inside ring of counterpunches is also provided each having a tip and a base and a generally triangular co-operative face and being pivotable about its base to swing the triangular cooperative face from a position generally parallel to the axis of the inside ring to a position inclined towards the axis of the inside ring. A first plate is provided having a section along the axis of the outside ring profiled to form a cam engageable with the punches for pivoting the punches, and a second plate is provided engageable with the counterpunches for limiting their pivoting. The operative and co-operative faces are circumferentially offset from each other so that, when a generally tubular form is inserted between the operative and co-operative faces and the cam engages the punches, the punches pivot to deform the tubular form and pivot the counterpunches, the tubular form being shaped into a wheel disk crenellated in circumferential profile.

BRIEF DESCRIPTION OF THE DRAWING

An understanding of additional aspects of the invention may be gained from a consideration of the following detailed description of representative embodiments thereof, taken in conjunction with the accompanying figures in the drawing, in which:

FIG. 1 is a view of a representative wheel disk constructed in accordance with the invention as viewed along the axis of the disk;

FIG. 2 is a sectional view taken generally along the line 2—2 of FIG. 1 and looking in the direction of the arrows;

FIG. 3 is a sectional view taken generally along the line 3—3 of FIG. 1 and looking in the direction of the arrows;

FIG. 4 is a sectional view taken generally along the line 4—4 of FIG. 1 and looking in the direction of the arrows;

FIG. 5 is a view of a second representative embodiment of a wheel disk constructed in accordance with the invention, the wheel disk being viewed in a direction parallel to its axis;

FIG. 6 is a sectional view taken generally along the line 6—6 of FIG. 5 and looking in the direction of the arrows;

FIG. 7 is a sectional view taken generally along the line 7—7 of FIG. 5 and looking in the direction of the arrows;

FIG. 8 is a perspective view showing a first stage in the method of manufacture of a wheel disk in accordance with the invention;

FIG. 9 is a perspective view showing a second stage in the manufacture of a wheel disk in accordance with the invention;

DESCRIPTION OF THE PREFERRED EMBODIMENTS

Figure 10:
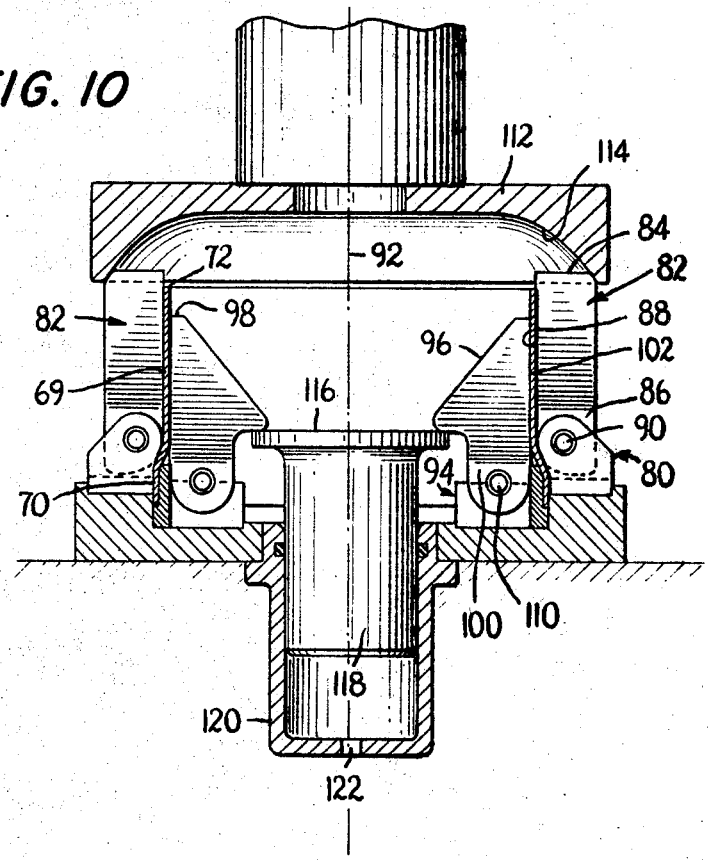
FIG. 10 is a view in elevation and partly in section of apparatus constructed in accordance with the invention for manufacturing a wheel disk.

FIGS. 1-4 show the details of a first embodiment of a wheel 20 constructed in accordance with the invention. The wheel 20 includes a wheel disk 22 connected at its central portion to a hub 23 and at its outer periphery to a wheel rim 24. The rim 24 is shown only in FIG. 2.

At the locus of the connection between the disk 22 and the rim 24, the disk is provided with a cylindrical or frusto-conical border 26 free of undulations. The border 26 is joined by a smoothly-rounded molding 28 also free of undulations, to a web 30 formed with crenellations. The web 30 and border 26 are axially on opposite sides of the molding 28.

The depth of the crenellations is maximum adjacent to the hub 23 and ranges from the maximum down to zero adjacent to the rim 24. The crenellations include lateral portions 32 and 34 between adjacent crenels 36 and merlons 38. The axial extent of the border 26 is at least equal to the maximum axial extent of the lateral portions, 32 and 34.

In the analogy to a battlement, it is of course arbitrary whether the wheel disk is viewed with the side 40 (which is the side adjacent to the outer side of the automotive vehicle when the wheel 20 is mounted in position) facing up as in FIG. 2 or facing down. Inasmuch as the outer side 40 of the wheel 20 is represented in FIG. 2 as facing up rather than down, the portions of the crenellations identified as 36 may be regarded as the crenels, and the portions of the crenellations identified as 38 may be regarded as the merlons. The convention could, of course, with equal justification be adopted that the reference numerals 36 designate the merlons and the reference numerals 38 designate the crenels. Either convention accurately describes the crenellated structure shown in FIGS. 1-4.

In accordance with the invention, the lateral portions 32 and 34 are generally triangular in shape and have their maximum axial extent (extent along the axis of the wheel) adjacent to the hub 23. The bases 42 and 44 of the lateral portions 32 and 34, respectively, are rigidly secured to and preferably imbedded in the hub 23, which is itself a rigid structure. The lateral portions 32 and 34 have apexes 46 and 48, respectively, adjacent to the rim 24.

The tapered structure of the lateral portions 32 and 34 tailors the strength of the wheel at all points along its radius to the stresses encountered at such points so that, at each point, the wheel has adequate strength, and, at the same time, a minimum of metal is required for the fabrication of the wheel.

The crenellated structure includes, in addition to the lateral portions 32 and 34, outer portions 50 and inner portions 52. The portions 50 and 52 are "outer" and "inner," respectively, in the sense that they are closer, respectively, to the outer and inner sides of the vehicle on which the tire is mounted.

The inner portions 52 are provided with openings 54, facilitating air circulation and contributing to the lightness and low inertia of the wheel.

Other openings 56 are provided in the inner portions 52, or some of them, for receiving lugs or bolts adapted to attach the wheel to a wheel support flange on the vehicle.

The crenels 36 and merlons 38 need not all be of the same depth at a given radial distance from the axis of the wheel. As FIG. 3 shows, different depths may obtain as a given radial distance from the axis of the wheel. Auxiliary ribs (not shown) may be super-imposed on the basic or large-amplitude crenellated structure, particularly in cases where the crenellated structure is repeated a relatively small number of times around the circumference of the wheel. In the embodiment of FIGS. 1-4, there are six repetitions or cycles of the crenellated structure around the circumference of the wheel.

The hub 23 includes an inside bearing surface facilitating the centering of the wheel, and the border 26 can be joined by means such as riveting or spot welding to the rim 24, so that the wheel is rigid as a unit and accurately centered on the axle of the automotive vehicle.

In the embodiment of FIGS. 5-7, there are ten cycles or repetitions of the crenellated structure around the circumference of the wheel. There are thus ten outer portions 60 and ten inner portions 62.

The outer portions 60 have a simpler profile than in the embodiment of FIGS. 1-4, there being no superposition of crenellations. The simplified construction of the outer portions 60 is made possible by the larger number of cycles or repetitions fo the crenellated structure around the circumferences of the wheel. This is not to say, of course, that a super-position of crenellations is always required when there are six repetitions and never required when there are ten repetitions. In selecting the particular embodiment of the invention best suited for a particular purpose, due regard may of course be had for the material of which the wheel is made, the size of the wheel is proportion to the weight and speed capabilities of the vehicle, and other factors, as those skilled in the art will understand.

The embodiment of FIGS. 5–7 differs from that of FIGS. 1–4 in the additional respect that the central radial line 64 of the outer portion 60 is curved, as FIG. 6 clearly shows. The curve may be substantially parabolic or circular but is slight (that is, of large radius) compared to the radius of the wheel considered as a whole.

Mounting of the wheel is facilitated by means of a centering attachment. To this end, the hub 66 is provided with driving catches 67 and formed with a bore 65 extending entirely therethrough. The bore 65 accommodates the axle (not shown) of the vehicle, and a centering attachment (not shown) is adapted to bear against the outer surface 68 of the hub 66.

In both the embodiment of FIGS. 1–4 and the embodiment of FIGS. 5–7, the portions 50, 52, 60, and 62 are developable about the axis of the tire; specifically, they are portions of surfaces of revolution about the axis of the tire. In other embodiments of the invention, other developable surfaces may be employed and it is even possible to depart from a developable surface, but, preferably, the departure should be only slight. Thus, the surfaces 50, 52, 60 and 62 should substantially conform to developable surfaces. In this way, one obtains maximum rigidity of the wheel in an axial direction without the necessity of subjecting the metal of which the wheel is fabricated to an extension or stretching of more than a few percent, and this contributes to the fabrication of the wheel using minimum power and machinery of minimum size and cost.

In both embodiments of the invention described above, the wheel disk is offset in an axial direction from the wheel rim 24.

The web of the disk consists entirely of a material which can be made into or worked in sheets, for example, ordinary steel plate and stainless steel plate. In particular, the invention facilitates the use of stainless steel, which is easier to shape into folds than to dish and which, in the case of a wheel disk, makes possible the elimination of the painting of the disk and the chromed metal hub cap generally used.

The hub 23 and the corresponding hub 66 consist preferably entirely of a rigid material which can be molded, as by an injection process, such as steel, alloys of aluminum or of non-ferrous metals, and resins which may or may not be reinforced. Thus, the hubs may comprise a polyester, epoxy, or polypropylene material. The important consideration is that the crenellations of the web be imbedded in a rigid hub or secured to another rigid supporting structure such as a tube.

In the embodiments of the invention described above, the angles about the axis of the wheel formed by the inner and outer portions 50 and 52 (FIG. 1) and 60 and 62 (FIG. 5) are not equal. It is also within the scope of the invention, however, to make the angles equal. Further, these surfaces can be made substantially identical or can be made with periodical or non-periodical differences. Preferably, the number of cycles or repetitions of the crenellations around the circumference of the wheel varies between three and twelve, there being the same number of inner portions as outer portions.

In accordance with the method of the invention, three steps or stages are involved.

The first step or stage is represented by FIG. 8, which shows the manufacture by any conventional means of a generally cylindrical form.

FIG. 9 shows the second step or stage, in which the generally cylindrical form shown in FIG. 8 is radially expanded at one end 70.

FIGS. 10–13 show the third stage or step in the manufacturing process in which the second or other end 72 of the generally tubular form 69 is folded down to impart to the central portion of the disk the desired final configuration.

Figure 11:
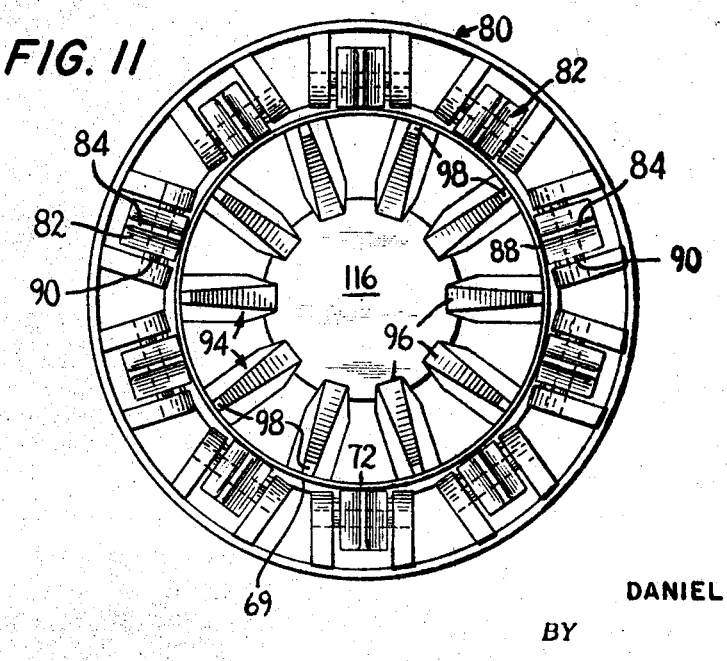
FIG. 11 is a plan view of the apparatus of FIG. 10.
Figure 12:
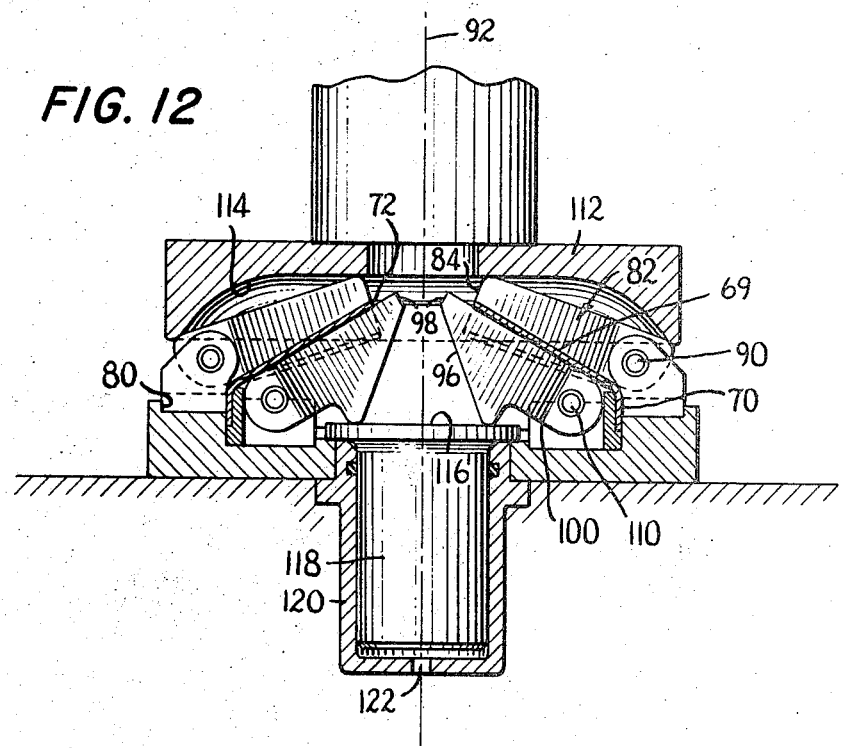
FIG. 12 is a view similar to FIG. 10 but showing the apparatus in an actuated position.

FIGS. 10–13 also show the apparatus of the invention for performing the third step or stage of the method of the invention. In FIGS. 10 and 12, certain of the punches and counterpunches referred to hereinafter are omitted for clarity. An outside ring 80 of punches 82 is provided. Each punch has a tip 84 and a base 86 and a generally triangular operative face 88. Each punch 82 is pivotable about its base 86, which is mounted on a shaft 90, to swing the triangular operative face 88 from a position generally parallel to the axis 92 of the outside ring 80 to a position inclined towards the axis 92.

An inside ring 94 of counterpunches 96 is also provided. Each counterpunch 96 has a tip 98 and a base 100 and a generally triangular co-operative face 102. Each counterpunch 96 is pivotable about its base 100, which is mounted on a transverse shaft 110. The counterpunches 96 are thus adapted to swing so that the triangular co-operative faces 102 pivot from a position generally parallel to the axis 92 of the inside ring to a position inclined towards the axis. (The axis 92 is the axis of both the outside 80 and the inside ring 94, inasmuch as the rings are concentric.)

A cam plate 112 having a section along the axis of the rings profiled to form a cam surface 114 engageable with the punches is adapted to pivot the punches inwardly toward the axis 92 when the cam plate 112 is brought together with the punches 82. A stop plate 116 is engageable with the counterpunches 96 for limiting their pivoting. The stop plate 116 is connected to a piston 118 mounted within a cylinder 120 which may be provided with a suitable fluid such as oil through an aperture 122. The stop plate 116 thus offers resistance to the pivoting of the counterpunches 96 and stops the pivoting of the counterpunches 96 in their positions shown in FIGS. 12 and 13. After the completion of the fabrication of the wheel disk, the cam plate 112 is separated from the punches 82 and the completed wheel disk can be removed.

In operation, a generally cylindrical form 69 of the type shown in FIG. 8 is stretched at its end 70 as shown in FIG. 9 and inserted into the apparatus of FIGS. 10–13, the apparatus being in the position shown in FIGS. 10 and 11. The camming action described above is then caused to take place by suitable motive means (not shown) to effect the formation of the wheel disk.

Figure 13:
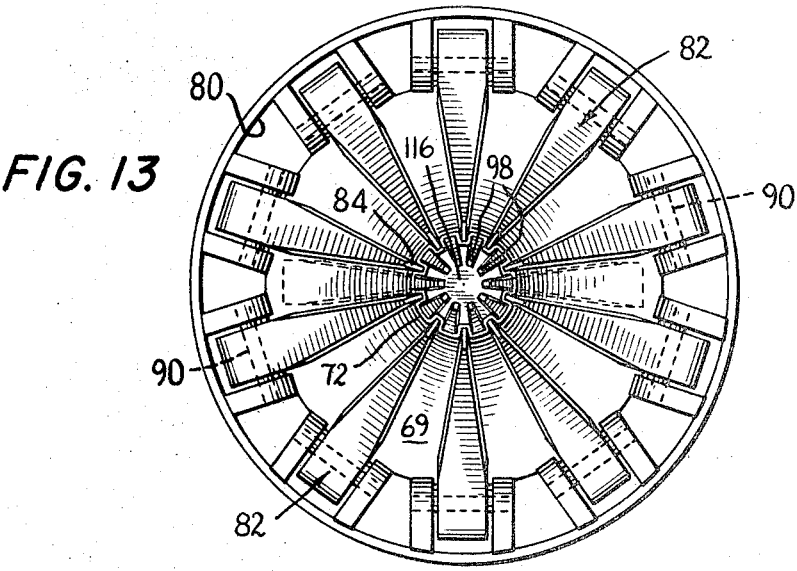
FIG. 13 is a view similar to FIG. 11 but showing the apparatus in an actuated position.

The punches 82 and counterpunches 96 are circumferentially off set from each other so that they can move from the positions of FIGS. 10 and 11, in which they are disposed on opposite sides of a vertical cylindrical surface occupied by the form 69, to the positions of FIGS. 12 and 13, in which they form imbrication or partial overlapping.

The entire extent of the operative faces 88 and 102 contacts the form 69 in order to provide maximum control over the contouring of the form during the movement of the apparatus from the configuration of FIGS. 10 and 11 to that of FIGS. 12 and 13. The shaping of the disk comprises a slight stretching of the sheet metal forming the form 69 so that a completely regular surface free of any dents is provided. The web is completely shaped in a single operation at the third stage with a minimum use of power and with a light and economical tool.

The apparatus of FIGS. 10–13 is specifically adapted to provide ten cycles or repetitions of crenellations around the circumference of the wheel disk and can of course be modified to provide any other desired number of cycles or repetitions. The movement of the cam plate 112 may be stopped by suitable means such as a limit switch (not shown) at either end or both ends of its movement.

Thus there is provided in accordance with the invention a novel and highly-effective wheel disk adapted to withstand radial, circumferential, and axial stresses better than conventional wheel disks while using less material or less expensive material. There is also provided in accordance with the invention a novel and highly-effective method of making the new wheel disk. Finally, there is provided in accordance with the invention inexpensive apparatus for facilitating manufacture of the wheel disk.

Many modifications of the representative embodiments of the invention described above will readily occur to those skilled in the art. For example, the axial extent of the border 26 shown in FIG. 2 and the corresponding border shown in the other illustrated embodiment of the wheel disk can be varied by variation of the step of widening the end 70 of the tubular form 69 illustrated in FIG. 9. Further, the triangular lateral portions 32 and 34 shown in FIG. 2 and the corresponding triangular portions 33 shown in FIG. 6 can have the form generally of right triangles, acute triangles, isoceles triangles, or obtuse triangles in addition to the triangular shape shown in FIG. 2 and the approximately triangular shape (including a curved edge) shown in FIG. 6. Further, the inner and outer portions 50, 52, 60, and 62 may be parallel to each other and inclined differently with respect to the axis of the wheel from the inclinations illustrated in FIGS. 1 and 6. Also, a helicoidal spring or other biasing means may replace the means for introducing fluid into the cylinder 120 shown in FIGS. 10 and 12. Many other modifications of the representative embodiments disclosed above will readily occure to those skilled in the art.

Accordingly, the invention is to be construed as including all of the modifications thereof within the scope of the appended claims.

I claim:
1. In a wheel having a wheel disk, a rigid hub attached to said disk for mounting said wheel on an axle, and a rim attached to said disk for mounting a tire on said wheel, the improvement wherein said disk is rigidly secured to said hub and the circumferential profile of said disk is formed with crenellations, the depth of said crenellations being maximum adjacent to said hub and ranging from said maximum down to zero adjacent to said rim, said crenellations including lateral portions between adjacent crenels and merlons, said lateral portions being generally triangular with a base adjacent to said hub and an apex adjacent to said rim, said crenels and merlons lying in surfaces of revolution about the axis of said wheel, and adjacent ones of said lateral portions, crenels and merlons lying in surfaces that have substantially the same angular relationship with respect to each other at all points along a radius of said disk, and wherein said disk is formed at the locus of connection to said rim with a border free of undulations, coaxial with said rim, and axially offset from said crenellations.

2. A wheel as set forth in claim 1 in which said lateral portions respectively lie substantially in planes containing the axis of said wheel.

3. A wheel as set forth in claim 1 in which said lateral portions include at least one curved edge.

4. A wheel as set forth in claim 1 in which said border is cylindrical.

5. A wheel as set forth in claim 1 in which said border is frusto-conical.

6. A wheel as set forth in claim 1 in which said disk is offset from the bottom of said rim axialy of said wheel.

7. A wheel as set forth in claim 1 in which said border has an extent axially of said wheel at least equal to the maximum extent of said lateral portions axially of said wheel.

8. A wheel as set forth in claim 1 in which said border is connected to said disk by a molding likewise free of undulations, said border and disk being located on opposite sides of said molding in a direction axial of said tire.

9. A wheel as set forth in claim 1 in which said disk is made of stainless steel.

10. A wheel as set forth in claim 1 in which said hub is made of moldable material.

References Cited

UNITED STATES PATENTS

| 1,131,883 | 3/1915 | Williams | 301—64(SD) |
| 1,213,564 | 1/1917 | Williams | 301—64(S) |
| 1,444,405 | 2/1923 | Mathias | 301—64(SD) |
| 2,173,584 | 9/1939 | Frank | 301—63X |

FOREIGN PATENTS

| 3Ad. 24,427 | 3/1922 | France. |
| 497,257 | 9/1919 | France. |
| 512,736 | 10/1920 | France. |
| 149,377 | 8/1920 | Great Britain. |
| 170,740 | 11/1921 | Great Britain. |

RICHARD J. JOHNSON, Primary Examiner

U.S. Cl. X.R.

29—159.01